April 30, 1957 R. W. KETCHLEDGE 2,790,956

DISTORTION CORRECTOR

Filed July 9, 1953 2 Sheets-Sheet 1

INVENTOR
R. W. KETCHLEDGE
BY
Ralph P. Holcomb
ATTORNEY.

April 30, 1957 R. W. KETCHLEDGE 2,790,956

DISTORTION CORRECTOR

Filed July 9, 1953 2 Sheets-Sheet 2

INVENTOR
R. W. KETCHLEDGE
BY Ralph P. Holcomb
ATTORNEY

United States Patent Office 2,790,956

Patented Apr. 30, 1957

2,790,956

DISTORTION CORRECTOR

Raymond W. Ketchledge, Whippany, N. J., assignor to Bell Telephone Laboratories, Incorporated, New York, N. Y., a corporation of New York Application July 9, 1953, Serial No. 367,069

14 Claims. (Cl. 333—28)

This invention relates to signal transmission systems and more particularly to means for correcting or equalizing imperfections in the loss or the delay of such systems.

An object of the invention is to simplify the construction of an adjustable distortion corrector for equalizing a complicated signal transmission system.

A further object is to provide adjustable simultaneous loss and delay equalization.

An additional object is to provide independently adjustable loss and delay equalization.

Another object is to provide equalizer characteristics which are orthogonal.

A still further object is to provide an equalizer suitable for use in broad-band systems.

Signal transmission systems, particularly those which transmit a broad frequency band over a considerable distance, suffer from complicated transmission imperfections. Different systems of similar design also tend to differ greatly in their imperfections. This is due to the difficulty in obtaining uniformity in manufacture. Thus, there is a need for an equalizer which is capable of correcting for these highly variable imperfections.

It is known that an equalizer which can introduce harmonically related shapes corresponding to the terms of a Fourier series has great generality since any given transmission characteristic can be accurately represented as a Fourier series. Unfortunately, equalizers heretofore known which yield this type of shape introduce high flat losses, suffer from parasitic capacitances, are excessively complex, or have other defects.

The distortion corrector in accordance with the present invention provides adjustable shapes corresponding to the terms of a Fourier-type series but overcomes, to a great extent, the defects mentioned above by employing a combination of only two simple delay lines and means for obtaining in additive combination a group of signal replicas having various delays. The structure permits absorbing parasitic capacitances without ill effect. The flat loss tends to be low and may even be converted into a gain by the use of amplifying devices in the combining circuits.

More specifically, the equalizer comprises a terminated input delay line, a terminated output delay line, and a series of paths of adjustable transmission from various points on the input line to certain corresponding points on the output line. The delay lines may, for example, be multi-section, low-pass, wave filters, which permit the absorption of parasitic capacitances. Each of the adjustable transmission paths may include a constant-impedance arrangement of variable capacitances and an isolating or amplifying device, which may be a thermionic tube or a transistor. This device serves to prevent interaction between the delay lines, and may provide considerable gain if desired. Alternatively, each of the paths may include one or more fixed resistors and one or more resistors with adjustable tapping points. In another embodiment, each path is provided by an adjustable inductive coupling between a series inductance in one delay line and the corresponding inductance in the other line. The adjustable elements in the connecting paths may be ganged in pairs to two independent controls, one for loss and the other for delay. A similar pair of controls are used for each Fourier term. By suitable design of the delay lines, the equalizer shapes provided may be made harmonic for various degrees of warping of the frequency scale. When the delay lines are chosen to have a phase characteristic which is proportional to frequency, the shapes are cosines of frequency. Otherwise, the shapes are cosines on a warped frequency scale.

The nature of the invention and its various objects, features, and advantages will appear more fully in the following detailed description of typical embodiments illustrated in the accompanying drawings, of which Fig. 1 is a schematic circuit of an adjustable distortion corrector in accordance with the invention which provides simultaneous loss and delay equalization;

Figure 1:
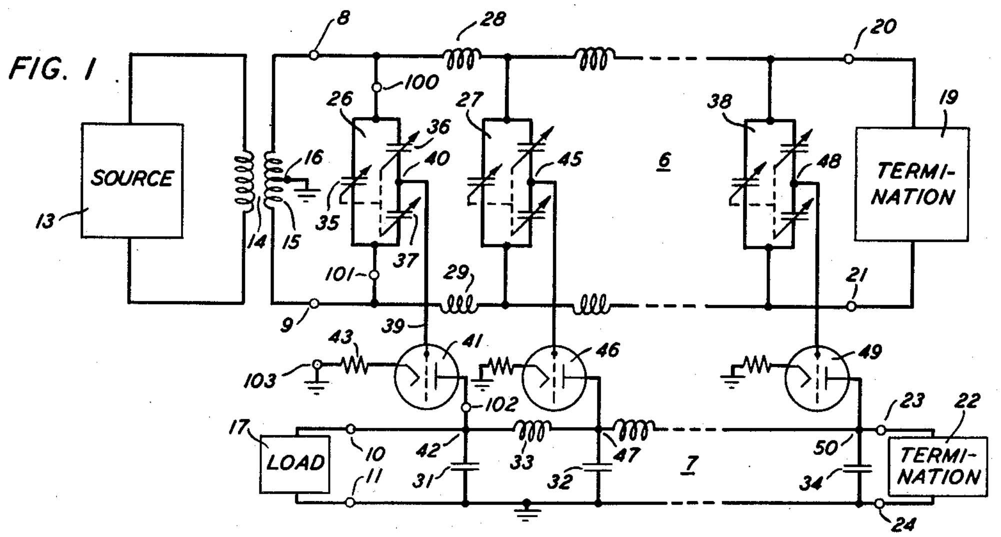

By way of introduction, some the underlying theory of the invention will be presented. If an electrical signal whose amplitude is represented by the complex number $E_1$ passes through a first delay line having a phase shift $\theta_1$, a second delay line having a phase shift $\theta_1$, and a network which changes the amplitude by a factor $k$, which may be positive or negative, the modified signal $E_2$ is $$E_2=kE_1\underline{/\theta_1+\theta_2} \qquad (1)$$

If the modified signal is added to the original signal, the sum $E_s$ is $$E_s=E_1+E_2=E_1(1+k\underline{/\theta_1+\theta_2}) \qquad (2)$$

The ratio R of $E_s$ to $E_1$, which determines the transmission characteristic, is $$R=E_s/E_1=1+k\underline{/\theta_1+\theta_2} \qquad (3)$$

which in complex notation may be written as $$R=1+k\cos(\theta_1+\theta_2)+jk\sin(\theta_1+\theta_2) \qquad (4)$$

If $k$ is small compared to unity, R is approximately $$R=1+k\cos(\theta_1+\theta_2) \qquad (5)$$

and the transmission loss characteristic obtained will be cosine in form. The related delay characteristic will also be cosine in form.

In one embodiment of the invention, the first delay line is constituted by $n$ tandem-connected sections each having a phase shift $\theta_1$ and the second delay line is made up of the same number of sections in each of which the phase shift is $\theta_2$. The junction points in the one line are connected, respectively, to the junction points in the other line by transmission paths in which the amplitude change factors are $k_1, k_2 \ldots k_n$, respectively. Following Equation 5, the approximate voltage ratio $R_1$ of such a structure is of the form $$R_1=1+k_1\cos(\theta_1+\theta_2)+k_2\cos 2(\theta_1+\theta_2)+\ldots k_n\cos n(\theta_1+\theta_2) \qquad (6)$$

There is thus provided an equalizer whose transmission loss characteristic is represented by $n$ harmonically related cosine terms, the magnitudes of which are controlled by the chosen values of the $k$'s. However, if each $k$ is not small compared to unity, the shapes produced tend to depart from cosines. The equalizer will also have a related delay characteristic made up of $n$ harmonic shapes.

When true cosine shapes, on an amplitude basis, are desired regardless of the magnitudes of the $k$'s, or where independent loss or delay equalization is desired, the structure is modified by extending the delay lines and adding a set of connecting paths whose phase shifts are the negative of those in the first set and whose amplitude change factors are $k_1'$, $k_2'$ . . . $k_n'$, respectively. Following Equation 4, the voltage ratio $R_2$ of the modified structure is $$R_2=1+k_1\cos(\theta_1+\theta_2)+k_1'\cos(-\theta_1-\theta_2)+k_2\cos 2(\theta_1+\theta_2)+k_2'\cos 2(-\theta_1-\theta_2)+\dots k_n\cos n(\theta_1+\theta_2)+k_n'\cos n(-\theta_1-\theta_2)+j[k_1\sin(\theta_1+\theta_2)+k_1'\sin(-\theta_1-\theta_2)+k_2\sin 2(\theta_1+\theta_2)+k_2'\sin 2(-\theta_1-\theta_2)+\dots k_n\sin n(\theta_1+\theta_2)+k_n'\sin n(-\theta_1-\theta_2)] \quad (7)$$

But since, for any angle A, $$\cos(-A)=\cos A \quad (8)$$

and $$\sin(-A)=-\sin A \quad (9)$$

we may write Equation 7 as $$R_2=1+(k_1+k_1')\cos(\theta_1+\theta_2)+(k_2+k_2')\cos 2(\theta_1+\theta_2)+\dots(k_n+k_n')\cos n(\theta_1+\theta_2)+j[(k_1-k_1')\sin(\theta_1+\theta_2)+(k_2-k_2')\sin 2(\theta_1+\theta_2)+\dots(k_n-k_n')\sin n(\theta_1+\theta_2)] \quad (10)$$

It is apparent from Equation 10 that the transmission loss of this modified form of the equalizer is represented by $n$ harmonically related cosine terms. The sign and magnitude of each of these terms depend upon the sum of the corresponding factors $k_n$ and $k_n'$, and may be adjusted as desired by adjusting these factors. The phase shift is represented by $n$ harmonically related sine terms. The sign and magnitude of each are determined by the difference between $k_n$ and $k_n'$. The delay characteristic, which is proportional to the slope of the phase characteristic, is made up of $n$ harmonically related cosine shapes. If $\theta_1$ and $\theta_2$ are each proportional to frequency, the loss and delay shapes will be nearly true cosines of frequency. By properly choosing the frequency characteristics of $\theta_1$ and $\theta_2$, the frequency scale may be warped in such a way that the loss terms and the delay terms have orthogonal shapes other than cosines.

It is also apparent from Equation 10 that when the factors $k_n$ and $k_n'$ are of the same sign and equal in magnitude, all of the $j$-terms disappear and loss but no delay is introduced by the equalizers. On the other hand, if $k_n$ is equal to $-k_n'$, the cosine terms vanish and delay but no loss is introduced. Thus, the equalizer may be designed to provide independent loss or delay compensation if desired.

Returning to the figures, Fig. 1 shows schematically one embodiment of an adjustable distortion corrector or equalizer in accordance with the invention which provides simultaneous loss and delay equalization. It is particularly useful for the equalization of minimum phase systems where loss equalization gives adequate delay equalization at the same time. The equalizer comprises an input delay line 6 and an output delay line 7 connected between a pair of input terminals 8, 9 and a pair of output terminals 10, 11. A source 13 of signals to be equalized is connected through a transformer 14 to the input terminals 8, 9. The transformer 14 has a secondary winding 15 which is grounded at its electrical midpoint 16 so that the signals from the source 13 impressed upon the input terminal 8 are equal in magnitude but opposite in phase to those impressed upon the terminal 9. A load 17 of suitable impedance is shown connected to the output terminals 10 and 11.

A termination 19 which substantially matches the image impedance of the delay line 6 is connected to its terminals 20 and 21. A similar matching termination 22 is connected to the terminals 24 and 25 of the delay line 7. The function of the terminations 19 and 22 is to prevent multiple reflections at the ends of the lines 6 and 7 which would undesirably alter the equalizer shapes.

As shown, each of the delay lines 6 and 7 is a multisection, low-pass wave filter of the ladder type comprising shunt capacitances and interposed series inductances. The input line may be balanced and the output line unbalanced, as shown. The number of sections in each corresponds to the desired number of terms in the Fourier series. Only two sections are shown in each delay line but more may be added, as indicated by the broken lines. In the delay line 6, the first section at the input end consists of the two capacitive shunt branches 26, 27 and the equal series inductances 28, 29. The corresponding section in the delay line 7, at the output end, is made up of the two shunt capacitances 31, 32 and the series inductance 33.

The shunt branch 26 comprises a capacitance 35 in parallel with the series combination of the two capacitances 36 and 37. The capacitances 35, 36 and 37 are adjustable and are preferably under a unitary control, as indicated by the broken lines connecting the arrows. The capacitance of the branch 26 remains constant for all settings of the control. Each of the shunt branches 27 and 38 has the same configuration as the branch 26, and also has a unitary control.

Each of the branches 26, 27 and 38 of the delay line 6 is connected to the corresponding branch in the delay line 7 through an isolating or amplifying device. Thus, in the path 39, the common terminal 40 between the capacitances 36 and 37 is coupled through a thermionic tube 41 to the point 42, and thence to the output terminal 10 of the line 7. The point 40 is connected to the control grid of the tube 41, and the point 42 to the plate. The cathode is grounded through a resistor 43 which provides feedback to stabilize and linearize the operation of the tube. Similarly, the point 45 is connected through the tube 46 to the point 47, and the point 48 through the tube 49 to the point 50. Power to operate the tubes 41, 46, and 49 may be supplied in a variety of ways. For example, the termination 22 may include a suitable source of plate voltage while at the same time presenting the proper matching impedance for the line 7.

The input and output capacitances of the tubes may be absorbed in the capacitances in the shunt branches of the delay lines. For example, the values of the capacitances 35, 36, and 37 in the branch 26 may be adjusted to allow for the grid-to-ground capacitance of the tube 41, and the capacitance 31 may be reduced in value by the amount of the plate-to-ground capacitance. Some of the capacitances, such as 31, 32 and 34, may be constituted entirely by the parasitic capacitances of the circuit.

The operation of the distortion corrector shown in Fig. 1 is as follows: The main part of the input signal from the source 13 passes through the shunt branch 26 and the tube 41 to the load 17 substantially without delay. This main signal determines the flat loss or gain of the equalizer. It is adjusted to the desired amplitude and polarity by properly setting the capacitances 35, 36 and 37. The first harmonic equalizer shape is obtained by another portion of the input signal which suffers a phase shift $\theta_1$ in the first section of the line 6, passes through the tube 46, and is further shifted in phase by $\theta_2$ in the end section of the line 7 before it reaches the load 17. The required polarity and amplitude are obtained by adjusting the three capacitances in the branch 27. In a similar manner, the $n$th harmonic shape is derived from a portion of the input signal which suffers a phase shift $n\theta_1$ as it travels the entire length of the line 6, passes through the tube 49, and is then shifted in phase by $n\theta_2$ as it traverses the entire line 7 to reach the load 17. The capacitances in the branch 38 are set for the desired amplitude and polarity. With a sufficient number of harmonic shapes, any desired transmission loss, or gain, characteristic may be obtained by properly adjusting the capacitances in the delay line 6. The delay characteristic, however, is not independently adjustable.

Figure 2:
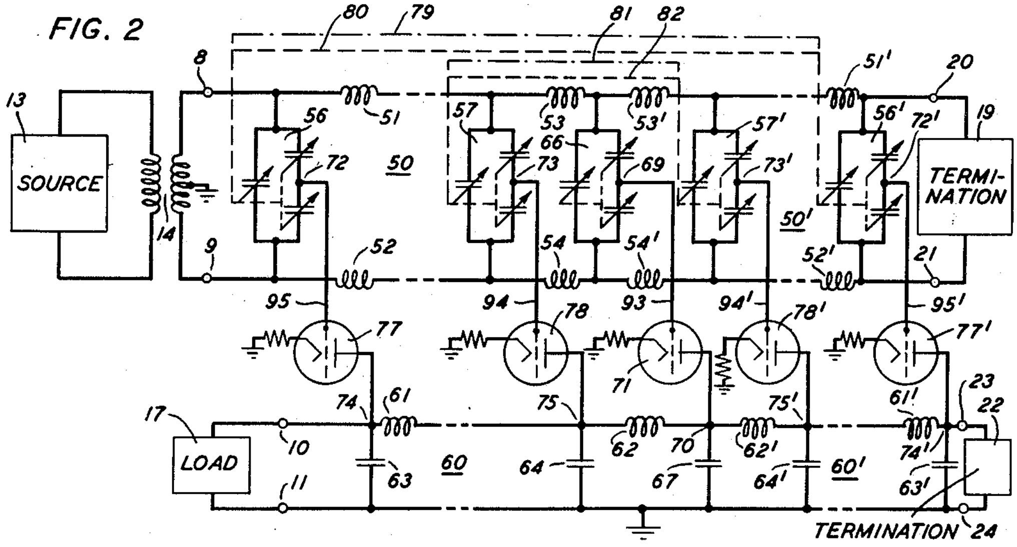
Fig. 2 is a schematic circuit of an embodiment of the invention providing independent loss or delay equalization.

Fig. 2 shows a distortion corrector in accordance with the invention which is suitable for independent loss and delay equalization. The circuit differs from the one shown in Fig. 1 principally in that, for the same number of harmonic shapes, each of the delay lines requires twice as many sections. Also, corresponding pairs of the ganged capacitances are linked together in a special way and the main signal path connects the centers of the delay lines.

In Fig. 2, the input delay line is made up of a left half 50 and a right half 50′ connected in tandem between the input terminals 8, 9 and the terminals 20, 21. Each of these halves 50 and 50′ is similar in configuration to the delay line 6 of Fig. 1. Thus, the left half 50 comprises the equal series inductances 51, 52, 53, 54 and the capacitive shunt branches 56, 57. Any required number of additional delay sections may be inserted, as indicated by the broken lines. The right half 50′, which is a duplicate of the left half 50, comprises the series inductances 51′, 52′, 53′, 54′ and the shunt capacitive branches 56′, 57′. Similarly, the output delay line consists of two identical halves 60 and 60′ each of the same configuration as the line 7 of Fig. 1. The equal series inductances are designated 61, 62, 62′, 61′ and the shunt capacitances 63, 64, 64′, 63′. The input line has a central shunt branch 66 and the output line a central shunt capacitance 67. The point 69 in the branch 66 is connected to the mid-point 70 of the output line through a thermionic tube 71. Similarly, the points 72, 73, 73′, 72′ in the shunt branches of the input line are connected, respectively, to the points 74, 75, 75′, 74′ in the output line through the thermionic tubes 77, 78, 78′, 77′.

The capacitances in each of the shunt branches 56, 57, 57′, and 56′ of the input line are ganged together, as indicated. Also, the capacitances in each of the shunt branches in the left half 50 are linked to the capacitances in the corresponding shunt branch in the right half 50′ in a special way. Thus, there are two linkages 79, 80 between the branches 56, 56′ and two other linkages 81, 82 between the branches 57, 57′. By using the linkage 79, the capacitances in the branches 56 and 56′ are so adjusted that the amplitude factor $k_n$ of the signal in the path 95 and the amplitude factor $k_n'$ of the signal in the path 95′ are changed by equal amounts in the same direction. When the linkage 80 is used, these capacitances are so adjusted that the amplitude factors $k_n$ and $k_n'$ are changed by equal amounts but in opposite directions. Similarly, the linkages 81 and 82 between the branches 57 and 57′ control the amplitude factors $k_1$ and $k_1'$ of the signals in the paths 94 and 94′, respectively.

Figure 5:
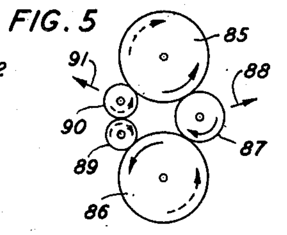
Fig. 5 shows diagrammatically a mechanical coupling arrangement for linking the dual control elements in Fig. 2.

Fig. 5 shows diagrammatically an arrangement which can be used for the linkages 79 and 80, for example. The circle 85 represents a rotatable shaft which controls the settings of the ganged capacitances in the branch 56, and 86 is a second rotatable shaft which controls the ganged capacitances in the branch 56′. It is assumed that the capacitances in the branches 56 and 56′ are so ganged that rotating the shafts 85 and 86 through equal angles will cause equal changes in the signals in the paths 95 and 95′, but that the direction of the change depends upon the direction of the rotation. However, the impedance of each branch remains constant regardless of the setting. A rotatable control 87 is shown in driving contact with both shafts 85 and 86 but may be moved out of engagement as indicated by the arrow 88. A second rotatable control 89 engages the shaft 86. An idler gear 90 is shown connecting the control 89 and the shaft 85, but it may be disengaged as indicated by the arrow 91. Operation of the control 88 rotates the shafts 85 and 86 in the same direction, for the linkage 79, while operating the control 89 rotates them oppositely, for the linkage 80. Thus, with the idler 91 disengaged, clockwise rotation of the control 87 causes counter-clockwise rotation of each of the shafts 85 and 86, as indicated by the solid-line arcuate arrows, and vice versa. With the idler 91 engaged and the control 88 disengaged, clockwise rotation of the control 89 causes counter-clockwise rotation of the shaft 86 but clockwise rotation of the shaft 85, as indicated by the broken-line arcuate arrows, and vice versa.

The operation of the distortion corrector shown in Fig. 2 is as follows: The source 13 supplies push-pull signals to the input terminals 8 and 9 via the transformer 14. The main signal path 93 is from the center 69 of the input delay line 50—50′ via the tube 71 to the center 70 of the output line 60—60′. Therefore, the three ganged capacitances in the branch 66 control the flat loss, or gain. The signals through the two adjacent connecting paths 94 and 94′ jointly determine the amplitude and sign of the first harmonic equalizer shape. As compared with the main signal, the signal in the path 94 passes through one less section in the input delay line and one less section in the output delay line, while the signal through the path 94′ passes through one more section in each of these lines. Therefore, compared to the main signal, the paths 94 and 94′ provide signals which are early and late, respectively. Thus according to the notation used in Equation 7, the signal in the path 94 suffers a phase shift $\theta_1+\theta_2$ while that in the path 94′ is shifted in phase by $-(\theta_1+\theta_2)$. In like manner, the signals in the paths 95 and 95′ jointly determine the sign and amplitude of the $n$th harmonic equalizer shape.

When the equalizer is used for loss correction, each of the shapes is adjusted by means of a control such as 88 which operates a linkage such as 79. In terms of the notation used in Equation 10, the factors $k_n$ and $k_n'$ are of the same sign and are kept equal for all adjustments. There is thus provided loss equalization without changing the delay. When delay correction is desired, a control such as 89 is rotated to operate a linkage such as 80. In this case, $k_n$ and $k_n'$ are kept equal in magnitude but are opposite in sign, and independent delay equalization is provided.

In connection with the circuits of Figs. 1 and 2, it is to be noted that, in some cases, each of the shunt branches in the input delay lines 6 and 50—50′ may comprise only two series-connected capacitances, instead of the three shown. However, the addition of the third capacitance often simplifies the construction of the ganging arrangement required to provide the desired variation in the factor $k_n$ while keeping the shunt impedance constant. For example, the use of the third capacitance may avoid providing one or more specially designed cams or specially shaped condenser plates for each group of capacitances.

Figure 3:
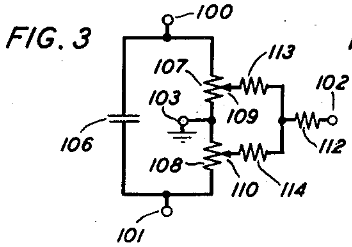
Figs. 3 and 4 are schematic circuits of alternative connecting paths which may be substituted for those shown in Figs. 1 and 2.
Figure 4:
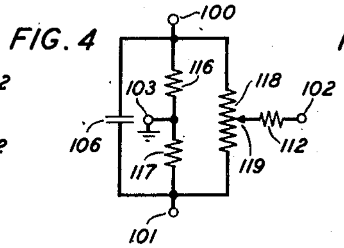

Connecting paths which do not require thermionic tubes may be substituted for those shown in Figs. 1 and 2. Figs. 3 and 4 show two such paths, either of which may be substituted, for example, for the circuit between the points 100, 101, 102, and 103 in Fig. 1. These points are similarly designated in Figs. 3 and 4. The fixed capacitance 106 has the value required for the shunt branch 26 of the delay line section.

In Fig. 3, two series-connected resistors 107 and 108 are connected in shunt with the capacitance 106. These resistors have adjustable tapping points 109 and 110, respectively. Their common terminal is connected to the grounded point 103. An isolating resistor 112 is connected at one end to the point 102. The other end of the resistor 112 is connected through the combining resistors 113 and 114 to the tapping points 109 and 110, respectively. With the tapping point 110 in its extreme upper position, any desired value of line voltage of one polarity with respect to ground may be obtained at the point 102 by moving the other tapping point 109 up or down. In like manner, if the tapping point 109 is in its lowest position, any value of voltage of the other polarity may be taken off by adjusting the tapping point 110. In this way, the desired polarity and magnitude of the factor $k_1$ may be obtained for the connecting path.

Fig. 4 shows a somewhat simpler alternative circuit that may be used for each connecting path. The capacitance 106 is shunted by two fixed series-connected resistors 116 and 117 which are grounded at their common terminal. The shunt resistor 118 has an adjustable tapping point 119 which is connected to the point 102 through the isolating resistor 112. The function of the resistors 116 and 117 is to stabilize the impedance between the points 100 and 101 as the tapping point 119 is adjusted to get a voltage of the desired polarity and magnitude.

Figure 6:
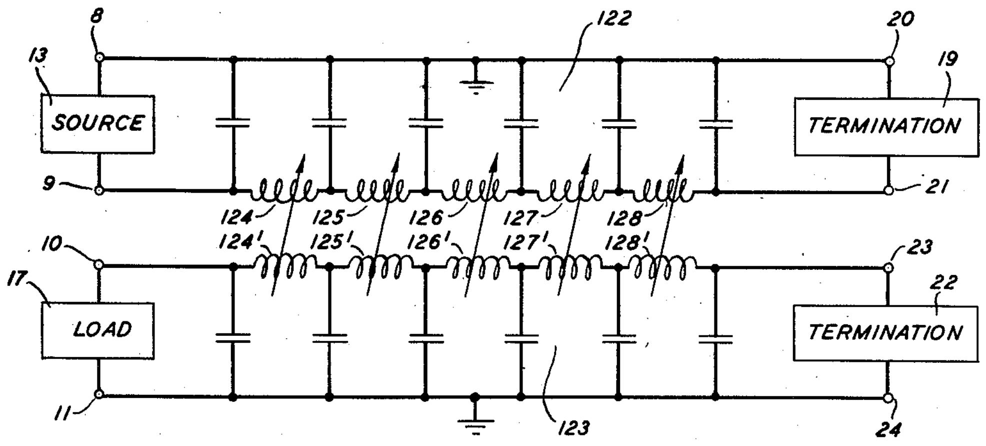
Fig. 6 shows schematically an embodiment of the invention employing inductive coupling between the delay lines.

Fig. 6 shows an embodiment of the invention in which adjustable inductive couplings provide the connecting paths between the input delay line 122 and the output delay line 123. Each line is a multisection, unbalanced, ladder-type, low-pass wave filter comprising shunt capacitors and interposed series inductors. Each of the inductors 124, 125, 126, 127, and 128 in the line 122 is coupled to the corresponding inductor 124′, 125′, 126′, 127′, or 128′ in the line 123 by an adjustable mutual inductance, as indicated by the arrows. The mutual inductance is not only adjustable in magnitude but may be either positive or negative. For example, each pair of coupled inductors, such as 124 and 124′, may be constituted by two solenoids positioned close together and provided with means for adjusting the angle between their axes. The coupling is maximum when the axes are parallel. Minimum coupling, accompanied by a change in sign, occurs when the angle passes through 90 degrees. A suitable method of construction is shown, for example, in Fig. 58 on page 89 of "Radio Engineers' Handbook," by F. E. Terman, first edition, published in 1943 by McGraw-Hill Book Company, New York. For simultaneous loss and delay equalization, the coupling between the end inductors 124 and 124′ is adjusted to provide the main signal path. The coupling between the next pair of inductors 125 and 125′ determines the amplitude and the sign of the first harmonic equalizer shape. The other couplings are adjusted to provide the other desired harmonic shapes. Any number of inductively coupled delay sections may be added to provide additional equalizer shapes, if desired.

The circuit shown in Fig. 6 may also be used to obtain independent loss or delay equalization. In this case, the coupling between the central inductors 126 and 126′ is adjusted to provide the main signal path. The first harmonic is controlled by the coupling between the inductors 125, 125′, which determines the factor $k_1$, and the coupling between the inductors 127, 127′, which determines the factors $k_1'$. The other couplings determine the factors $k_n$ and $k_n'$ associated with the $n$th harmonic. As explained above, for independent loss equalization, each of the factors $k_n$ must have the same sign and magnitude as the corresponding factor $k_n'$. For independent delay equalization, each of the factors $k_n$ must be equal to the negative of $k_n'$.

It is to be understood that the above-described arrangements are illustrative of the application of the principles of the invention. Numerous other arrangements may be devised by those skilled in the art without departing from the spirit and scope of the invention.

What is claimed is:

1. A transmission network comprising input terminals, output terminals, a direct transmission path between said input terminals and said output terminals, an input delay line connected at one end to said input terminals, an output delay line connected at one end to said output terminals, means for terminating the other ends of said lines in substantially matching impedances, a plurality of transmission paths $n$ in number connected between points on said input line at which the successive increments of phase shift measured from said one end thereof are, respectively, $A_1, A_2 \ldots A_n$ and points on said output line at which the successive increments of phase shift measurede from said one end thereof are, respectively, $B_1, B_2 \ldots B_n$, and means for adjusting the amplitude and reversing the polarity of the output voltage from each of said paths, said phase shifts having approximately the relationship $$A_1+B_1=A_2+B_2 \ldots =A_n+B_n$$

2. A network in accordance with claim 1 and means for supplying signal voltages equal in magnitude but opposite in phase to said input terminals, respectively.

3. A network in accordance with claim 1 in which said means are so adjusted that the output voltage from said direct path is large compared to the output voltage from any one of the other of said paths.

4. A network in accordance with claim 1 in which each of said paths includes an amplifier.

5. A network in accordance with claim 1 in which each of said paths includes a thermionic tube.

6. A network in accordance with claim 1 in which said last-mentioned means include two adjustable capacitors connected in series across said input delay line.

7. A network in accordance with claim 1 in which said input line comprises a shunt inpedance branch and said branch comprises two series-connected, adjustable capacitors which form a part of said means, said capacitors being ganged together in such a way that the impedance of said branch remains substantially constant for all adjustments of said capacitors.

8. A network in accordance with claim 7 in which said branch includes a third variable capacitor connected in parallel with said two capacitors.

9. A network in accordance with claim 1 in which said last-mentioned means include a resistor with adjustable tapping point connected across said input delay line.

10. A network in accordance with claim 1 in which one of said delay lines is a multisection, low-pass, wave filter.

11. A network in accordance with claim 1 in which each of said delay lines comprises $n$ series-connected inductors and said paths are constituted by adjustable inductive couplings between said inductors in one of said lines and the corresponding inductors in the other of said lines.

12. A transmission network comprising input terminals, output terminals, an input delay line connected at one end to said input terminals, an output delay line connected at one end to said output terminals, means for terminating the other ends of said lines in substantially matching impedances, a plurality of transmission paths $n$ in number connected between points on said input line at which the successive increments of phase shift measured from said one end thereof are, respectively, $A_1, A_2 \ldots A_n$ and points on said output line at which the successive increments of phase shift measured from said one end thereof are, respectively, $B_1, B_2 \ldots B_n$, means for adjusting the amplitude and reversing the polarity of the output voltage from each of said paths, and a direct transmission path between said input terminals and said output terminals, said phase shifts having approximately the relationship $$A_1+B_1=A_2+B_2 \ldots =A_n+B_n$$

13. A network in accordance with claim 12 which includes means for adjusting the amplitude of the output voltage from said direct path.

14. A network in accordance with claim 12 which includes means for reversing the polarity of the output voltage from said direct path.

References Cited in the file of this patent

UNITED STATES PATENTS

| | | |
|---|---|---|
| 2,263,376 | Blumlein | Nov. 18, 1941 |
| 2,545,871 | Bell | Mar. 20, 1951 |